United States Patent
Saulsbury et al.

(10) Patent No.: US 7,444,503 B2
(45) Date of Patent: Oct. 28, 2008

(54) METHOD AND APPARATUS FOR DELIVERING DEVICE DRIVERS

(75) Inventors: Ashley N. Saulsbury, Los Gatos, CA (US); David J. Redman, Fremont, CA (US); Gregory C. Onufer, Palo Alto, CA (US); John G. Johnson, San Jose, CA (US)

(73) Assignee: Sun Microsystems, Inc, Santa Clara, CA (US)

( * ) Notice: Subject to any disclaimer, the term of this patent is extended or adjusted under 35 U.S.C. 154(b) by 333 days.

(21) Appl. No.: 11/329,656

(22) Filed: Jan. 11, 2006

(65) Prior Publication Data

US 2007/0162625 A1    Jul. 12, 2007

(51) Int. Cl.
G06F 9/445 (2006.01)
G06F 15/177 (2006.01)

(52) U.S. Cl. .............. 713/1; 713/2; 713/100; 719/310; 719/327; 710/8; 710/10

(58) Field of Classification Search ............ 713/1, 713/2, 100; 710/8, 10
See application file for complete search history.

(56) References Cited

U.S. PATENT DOCUMENTS

| | | | | |
|---|---|---|---|---|
| 5,014,193 A * | 5/1991 | Garner et al. | ............... | 710/10 |
| 5,815,731 A * | 9/1998 | Doyle et al. | ............... | 710/10 |
| 5,826,090 A * | 10/1998 | Mealey et al. | ............... | 717/162 |
| 6,418,555 B2 * | 7/2002 | Mohammed | ............... | 717/169 |
| 6,442,683 B1 * | 8/2002 | Fleming, III | ............... | 713/1 |
| 6,496,847 B1 * | 12/2002 | Bugnion et al. | ............... | 718/1 |
| 6,763,458 B1 * | 7/2004 | Watanabe et al. | ............... | 713/100 |
| 6,772,420 B1 * | 8/2004 | Poger et al. | ............... | 719/327 |
| 7,107,330 B1 * | 9/2006 | Hamilton et al. | ............... | 709/221 |
| 2002/0143842 A1 * | 10/2002 | Cota-Robles et al. | ............... | 709/1 |
| 2003/0084380 A1 * | 5/2003 | Piazza et al. | ............... | 714/47 |
| 2005/0160157 A1 * | 7/2005 | Collier et al. | ............... | 709/222 |
| 2005/0198632 A1 * | 9/2005 | Lantz et al. | ............... | 718/1 |
| 2006/0053274 A1 * | 3/2006 | Nyuugaku et al. | ............... | 713/1 |
| 2006/0280195 A1 * | 12/2006 | Lopez et al. | ............... | 370/419 |
| 2007/0083862 A1 * | 4/2007 | Wooldridge et al. | ............... | 718/1 |

OTHER PUBLICATIONS

Knopper; "Building a self-contained auto-configuring Linux system . . ."; Jan. 1, 2000.*
IBM; "cfgmgr Command"; Aug. 1, 2004.*
Banzhaf"SCSI initial program loading for zSeries"; Apr. 6, 2004.*
Banzhaf; "SCSI initial program loading for zSeries"; Apr. 6, 2004.

* cited by examiner

Primary Examiner—Nitin C Patel
(74) Attorney, Agent, or Firm—Park, Vaughan & Fleming LLP

(57) ABSTRACT

A method and apparatus for delivering a device driver to an operating system without user intervention. One or more operating systems (e.g., different operating system programs, different versions of one operating system) execute on a computer platform. During booting of an operating system a device is identified for which a driver is needed. The driver is requested from a service processor of the platform, which includes memory or storage for storing multiple device drivers (or multiple versions of one driver, for different operating systems). The driver is retrieved from the service processor's storage and delivered to the operating system.

20 Claims, 2 Drawing Sheets

METHOD AND APPARATUS FOR DELIVERING DEVICE DRIVERS

BACKGROUND

This invention relates to the field of computer systems. More particularly, a system and methods are provided for delivering operating system device drivers with a computing device.

A new computer system or platform is traditionally loaded with a new or up-to-date operating system configured to use all components of the system. In particular, the operating system is configured with device drivers for driving devices (e.g., network interface circuits, input/output devices) installed in the platform.

In those situations in which a platform is not sold or delivered with drivers for all devices, the owner or operator of the platform generally must install additional drivers. For example, if a driver or a newer driver becomes available after the platform is delivered, the owner may need to download or install the driver from diskette, across a network, etc.

As a result, it is difficult to execute an old operating system on a new computer platform, because the operating system will generally not be configured with drivers for controlling all components of the new platform. There is no readily available method or scheme for automatically updating an old operating system with functionality (e.g., drivers) needed for a new computer platform, particularly where the functionality was not available when the operating system was originally released.

In addition, when a computing platform executes a single operating system to manage all applications running on the platform, the operating system generally is unable to efficiently utilize all components of the platform. Utilization of a platform's capacity may be increased by using virtualization to simultaneously execute multiple operating systems or multiple instances of an operating system.

The problem described above regarding the lack of up-to-date drivers for an operating system may be exaggerated on a computing platform that executes multiple operating systems, especially when an operator or user is encouraged to execute an old (or relatively old) operating system in such a virtualized environment.

SUMMARY

A method and apparatus are provided for delivering a device driver to an operating system without user intervention. One or more operating systems (e.g., different operating system programs, different versions of one operating system) execute on a computer platform. During booting of an operating system a device is identified for which a driver is needed. The driver may not currently be available because the device may be newer than the operating system, a driver may not have been available when the operating system was released or installed, a newer driver may be required to replace an older driver, etc.

The driver is requested from a service processor of the platform, which includes memory or storage for storing multiple device drivers (or multiple versions of one driver, for the same or different operating systems). The driver is retrieved from the service processor's storage and delivered to the operating system.

In an embodiment in which the computer platform runs multiple operating systems or operating system versions (e.g., in virtual environments), the platform may include a hypervisor for managing the operating systems' access to physical devices of the platform (e.g., by mapping virtual addresses to physical addresses).

The service processor may be an enhanced version of a traditional service processor, and may thus be configured to monitor components of the platform (e.g., power supply, fan).

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a method and apparatus are provided for delivering a device driver, with a computer system, for driving operation of one or more components of the system. The device driver may be designed to drive a communication device (e.g., network interface card), an input/output device (e.g., a disk drive, a graphics card), etc.

In this embodiment, the computer system includes a service processor, which may be separate from a primary processor or CPU. The service processor includes storage, such as a flash ROM or PROM, in which the device driver is stored. Drivers for all devices that are installed and/or that could be installed in the system may be stored in the service processor storage.

When the computer system is booted and the components and devices of the system are identified, if the operating system does not have available a driver (or the latest driver) for a device, that driver is retrieved from the service processor storage. The system may reboot during or after installation of the driver.

As one skilled in the art will appreciate, this scheme prevents a user from having to manually install a device driver (e.g., from CD-ROM). Thus, an old or older operating system can be used with a new or newer computer system that contains devices or components for which the operating system was not configured. Drivers for those devices will be automatically retrieved from the service processor when needed.

Figure 1:
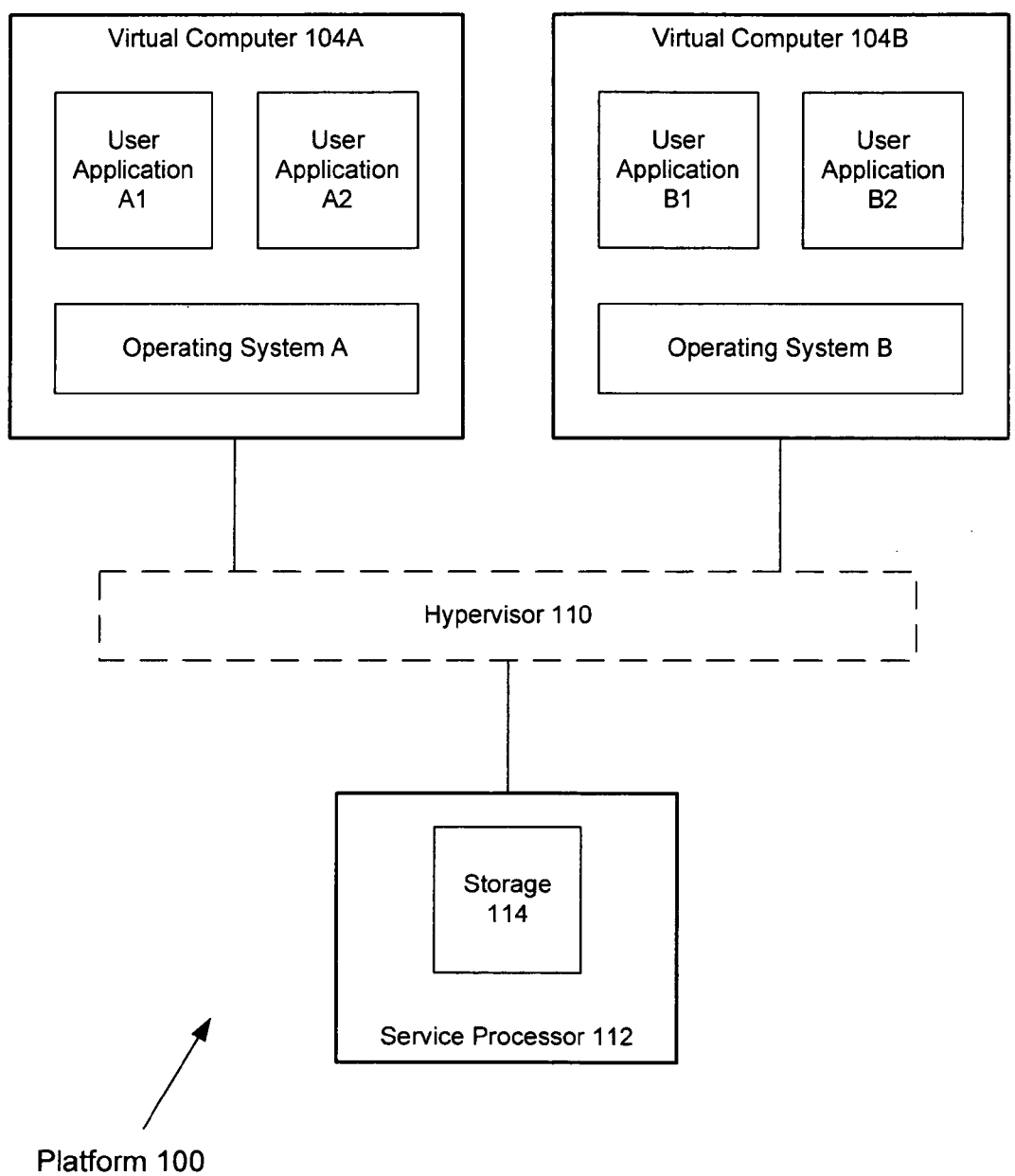
FIG. 1 is a block diagram depicting a computer platform in which an embodiment of the present invention may be implemented.

FIG. 1 is a block diagram of a computing platform on which an embodiment of the invention may be implemented. Platform 100 is capable of simultaneously running multiple operating systems or operating system kernels. In particular, platform 100 supports multiple simultaneous virtual computing environments in which the same or different operating systems (e.g., Solaris, Linux, Windows, Mac OS) execute to support user applications. User applications may include programs for word-processing, browsing the world-wide web, manipulating images, etc.

The virtual computing environments may be enabled or managed by a program such as VMware by VMware, Inc., Solaris with LDom (Logical Domain) extensions, the Xen virtual machine monitor, etc. Although only two virtual computers 104A, 104B are depicted in FIG. 1, platform 100 is capable of simultaneously hosting any number of virtual computers in other embodiments of the invention.

Each virtual computer's operating system provides services to its user applications, such as file access, communications, etc. Because multiple virtual computers may be operating simultaneously, their operating systems manage virtual memory that has been assigned to the virtual computer.

Platform 100 may include hypervisor 110 for managing the virtual computers' access to physical devices of the platform. Thus, hypervisor 110, or a similar module, manages the virtual computers' access to devices such as network interface devices, input/output devices, and so on, which are part of (or coupled to) platform 100 but are not depicted in FIG. 1. More particularly, the hypervisor may map virtual memory or storage addresses known to the virtual computers into physical addresses of the devices. Hypervisor 110 thus operates similar to a Memory Management Unit (MMU) of a traditional operating system.

Because the virtual computers' operating systems are separated from some or all platform hardware devices (e.g., by the hypervisor or a similar entity), the same operating systems may be easily installed and executed on a new platform, even if the operating system is relatively old. A new or updated hypervisor may be provided with the new platform to continue mapping the operating systems to new or updated functionality of the platform.

Platform 100 also includes service processor 112, which comprises storage 114. Storage 114 may include RAM, ROM, flash memory and/or other types of solid-state memory. In the illustrated embodiment of the invention, storage 114 is internal to service processor 112. In other embodiments of the invention, other memory or storage accessible to the service processor and virtual computers may be used to store device drivers, including non-solid-state memory.

In addition to other functions described herein, service processor 112 is configured to monitor various components or appliances of platform 100 for error conditions. For example, the service processor may monitor a power supply, a fan, a temperature sensor, etc.

In an embodiment of the invention, platform 100 is sold, shipped or delivered with one or more device drivers loaded in storage 114 of service processor 112. For example, the device drivers may include drivers for all devices or components sold or shipped with platform 100, and/or drivers for other devices that may be installed in the platform. In particular, storage 114 may include drivers that are newer than one or more operating systems that are or may be installed on the platform. Multiple versions of a particular driver may be stored, for different models of a device, different operating systems, etc.

Storage 114 may be significantly larger than a traditional service processor's memory. For example, a traditional service processor storage size may be on the order of 32 MB, while storage 114 is large enough to accommodate the extra operating system drivers. Storage 114 may incorporate flash memory, Programmable Read-Only Memory (PROM), other solid-state memory or even magnetic/optical storage components such as a disk drive, CD-ROM, and so on.

Figure 2:
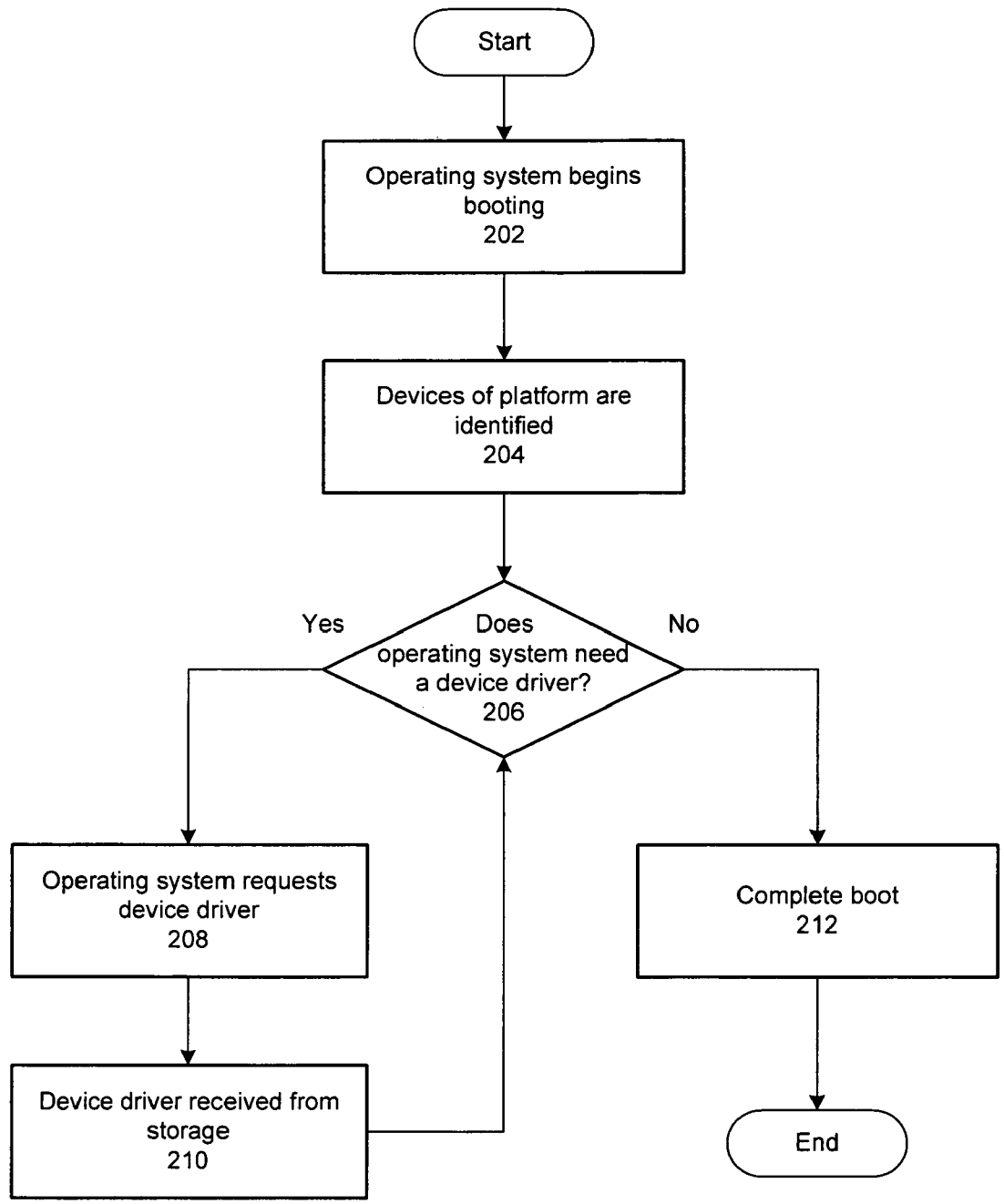
FIG. 2 is a flowchart illustrating one method of delivering device drivers with a computer system, in accordance with an embodiment of the invention.

FIG. 2 depicts a method of delivering device drivers according to one embodiment of the invention. In this embodiment, a computer platform is configured for virtualization. That is, the platform supports concurrent execution of multiple operating systems or multiple instances of an operating system, with each operating system executing in its own virtual environment. A hypervisor or similar module mediates and controls the operating systems' access to physical devices of the platform.

In operation 202, an operating system begins booting in its virtual environment. The boot process may be a traditional boot process, in which case the process is controlled by boot firmware that, among other tasks, identifies devices available to the operating system (e.g., network interface cards, disk drives, input devices, output devices).

In operation 204, the devices are identified to the operating system. For example, the boot firmware or other source may assemble or retrieve a list of installed devices and provide the list to the operating system.

In operation 206, the operating system determines whether it needs a device driver. Illustratively, a device identified to the operating system may not be recognized by the operating system, in which case it needs a driver in order to access or manipulate the device. Or, the operating system may determine that it needs a newer or updated driver for a device. If a driver is needed, the illustrated method continues with operation 208; otherwise, the method advances to operation 212.

In operation 208, the operating system requests the device driver. The request may be directed to the hypervisor, which may relay the request to the service processor, or the request may be issued directly to the service processor. Illustratively, the driver request identifies the operating system and the device for which a driver is needed. The service processor uses the provided information to retrieve a suitable driver from storage.

In operation 210, a driver for the specified device is delivered to the operating system. In the illustrated method, the driver is loaded in a manner similar to drivers already available to the operating system, and the method returns to operation 206 to determine whether any other drivers are needed. In another implementation, after receiving the driver the operating system may initiate a re-boot to start the boot process, during which the driver is loaded. In yet another implementation, the operating system may load the driver and the illustrated method may proceed directly from operation 210 to operation 212.

Illustratively, if no suitable driver is available, the operating system is notified and may prompt a user or operator of the platform to manually install a driver for the device using a conventional mechanism offered by the operating system.

In operation 212, the operating system already possesses all drivers it needs, and so the boot process continues normally.

In the embodiment of the invention depicted in FIG. 2, retrieval or delivery of a device driver is performed automatically when an operating system learns of a new device. In one alternative embodiment, the operating system may query a user or operator to determine whether it should retrieve a driver from storage. In this alternative embodiment, the operating system may identify the device for which a driver is needed and may also identify (via the service processor) the driver that would be retrieved (e.g., by name, date, version). In another alternative embodiment of the invention, retrieval or delivery of device drivers from a service processor may be disabled unless or until a user or operator enables such activity.

In yet another alternative embodiment of the invention, a computer platform may be dedicated to execution of a single operating system, but may still benefit from a method of delivering device drivers described above.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method of delivering a device driver to an operating system executing on a computer platform, the method comprising:
    during booting of the operating system, identifying a first device for which a device driver is needed;
    submitting a request for a device driver from the operating system to a service processor installed on the computer platform, wherein the service processor comprises a storage configured to store one or more device drivers; and
    if the device driver is available on the service processor, delivering the device driver to the operating system without intervention by a user,
    otherwise, if the device driver is not available on the service processor,
    notifying the operating system.

2. The method of claim 1, wherein the computer platform is configured to simultaneously execute multiple operating systems in one or more virtual environments.

3. The method of claim 2, wherein said requesting comprises:
    requesting the device driver from a hypervisor configured to manage access by the multiple operating systems to devices of the computer platform.

4. The method of claim 3, wherein said requesting further comprises:
    forwarding the request from the hypervisor to the service processor.

5. The method of claim 1, wherein said requesting comprises:
    identifying to the service processor the first device and a version of the operating system.

6. The method of claim 1, wherein said storage comprises solid-state memory having a capacity of at least 32 megabytes.

7. The method of claim 1, wherein said delivering comprises:
    loading the device driver.

8. A computer readable storage medium storing instructions that, when executed by a computer, cause the computer to perform a method of delivering a device driver to an operating system executing on a computer platform, without user intervention, the method comprising:
    during booting of the operating system, identifying a first device for which a device driver is needed;
    submitting a request for a device driver from the operating system to a service processor installed on the computer platform, wherein the service processor comprises a storage configured to store one or more device drivers; and
    if the device driver is available on the service processor, delivering the device driver to the operating system without intervention by a user,
    otherwise, if the device driver is not available on the service processor,
    notifying the operating system.

9. A service processor for a computer platform, wherein the service processor is configured to monitor operation of one or more components of the computer platform, the service processor comprising:
    a memory configured to store multiple device drivers for driving operation of one or more devices of the computer platform;
    wherein the multiple device drivers include multiple versions of a first device driver, each said version being configured for a different operating system;
    wherein the service processor is configured to receive a request for a device driver from an operating system; and
    if the device driver is available on the service processor, the service processor is configured to deliver the device driver to the operating system,
    otherwise, if the device driver is not available on the service processor, the service processor is configured to notify the operating system.

10. The service processor of claim 9, further comprising:
    a connection to a hypervisor configured to manage access to the one or more devices by multiple operating systems executing simultaneously on the computer platform.

11. The service processor of claim 9, wherein the service processor is separate from a central processing unit of the computing platform.

12. The service processor of claim 9, wherein the one or more components include a power supply and a fan.

13. The service processor of claim 9, wherein the one or more devices include one or more of:
    a communication interface;
    an input device;
    an output device; and
    a storage device.

14. A computer platform comprising:
    a first operating system configured to support one or more application programs;
    a service processor configured to monitor operation of one or more components of the platform, the service processor comprising a storage configured to store one or more device drivers for driving operation of a first device installed in the computer platform;
    wherein the operating system is configured to request a device driver from the service processor; and
    wherein the service processor is configured to deliver a device driver to the operating system if the device driver is available on the service processor, otherwise the service processor is configured to notify the operating system if the device driver is not available on the service processor.

15. The computer platform of claim 14, wherein the computer platform is configured to simultaneously run multiple operating systems, including the first operating system, in one or more virtual environments.

16. The computer platform of claim 15, further comprising:
 a hypervisor configured to manage access to the first device by the multiple operating systems.

17. The computer platform of claim 14, wherein the one or more device drivers comprise multiple drivers for the first device, each of the multiple drivers being configured for a different operating system.

18. The computer platform of claim 14, further comprising:
 a central processing unit separate from said service processor.

19. The computer platform of claim 14, wherein the one or more components include at least one of:
 a power supply; or
 a fan.

20. The computer platform of claim 14, wherein the first device is one of:
 a communication interface;
 a storage device;
 an input device; and
 an output device.

\* \* \* \* \*